(12) United States Patent
Alfano

(10) Patent No.: US 7,383,153 B2
(45) Date of Patent: Jun. 3, 2008

(54) METHOD FOR DETERMINING MAXIMUM CONJUNCTION PROBABILITY OF RECTANGULAR-SHAPED OBJECTS

(75) Inventor: Salvatore Alfano, Monument, CO (US)

(73) Assignee: Analytical Graphics, Inc., Exton, PA (US)

( * ) Notice: Subject to any disclaimer, the term of this patent is extended or adjusted under 35 U.S.C. 154(b) by 506 days.

(21) Appl. No.: 11/196,159

(22) Filed: Aug. 3, 2005

(65) Prior Publication Data

US 2007/0032984 A1 Feb. 8, 2007

(51) Int. Cl.
*G06F 15/00* (2006.01)
(52) U.S. Cl. .................................... 702/181
(58) Field of Classification Search .......... 702/179, 702/181
See application file for complete search history.

(56) References Cited

U.S. PATENT DOCUMENTS

| 6,691,034 B1 | 2/2004 | Patera et al. | |
|---|---|---|---|
| 6,820,006 B2 | 11/2004 | Patera | |
| 2003/0225546 A1* | 12/2003 | Alfano et al. | 702/150 |

OTHER PUBLICATIONS

Kitt C. Carlton-Wippern, "An Introductory Analysis of Satellite Collision Probabilities." Paper delivered at AAS/AIAA Astrodynamics Specialist Conference, Aug. 16-19, 1993, American Astronautics Society Publications Office, San Diego, CA.

Ken Chan, "Analytical Expressions for Computing Spacecraft Collision Probabilities." Paper given at AAS/AIAA Space Flight Mechanics Meeting, Feb. 11-15, 2001, American Astronautics Society Publications Office, San Diego, CA.

Ken Chan, "Collision Probability Analyses for Earth-Orbiting Satellites." Jan. 26, 2002, The Aerospace Corporation, Chantilly, VA.

N. Berend, "Estimation of the Probability of Collision Between Two Catalogued Orbiting Objects." Adv. Space Res. vol. 23, No. 1 pp. 243-247, 1999. Elsevier Science Ltd, Great Britain.

(Continued)

*Primary Examiner*—John E. Barlow, Jr.
*Assistant Examiner*—Stephen J Cherry
(74) *Attorney, Agent, or Firm*—Roberts, Mardula & Wertheim, LLC

(57) ABSTRACT

Maximum conjunction probability calculations are refined by addressing rectangular object shapes, even though their orientation may not be known. Object dimensions and relative miss distance, coupled with the aspect ratio of the projected combined covariance, are used to determine the size and orientation of the covariance as well as the object orientation that produces the maximum probability. In treating the objects as rectangles instead of spheres, the probability calculation becomes more realistic by accounting for object shape. In the absence of object attitude information, a footprint is created that completely defines the region where the two objects might touch. This footprint can then be rotated to determine the orientation that produces the largest probability, making it the most conservative estimate for the given conjunction conditions. Sufficiency of the positional data is accessed to meaningfully support the calculations by using the associated standard deviation to demarcate a probability dilution region.

15 Claims, 8 Drawing Sheets

OTHER PUBLICATIONS

D. Oltrogge and R. Gist, "Collision Vision: Situational Awareness for Safe and Reliable Space Operations." Paper at 50th Intl. Astronautical Congress, Oct. 4-8, 1999. The American Institute of Aeronautics and Astronautics, Inc.

James L. Foster Jr. and Herbert S. Estes, "Parametric Analysis of Orbital Debris Collision Probability and Maneuver Rate for Space Vehicles." Aug. 1992, Lyndon B. Johnson Space Center, NASA, Houston, TX.

Dr. Robert G. Gottlieb, "Orbit Determination Accuracy Requirements for Collision Avoidance." Paper at 11th AAS/AIAA Space Flight Mechanics Meeting, Feb. 11-15, 2001. American Astronautical Society Publications Office, San Diego, CA.

Maruthi R. Akella and Kyle T. Alfriend, "Probability of Collision Between Space Objects." Journal of Guidance, Control, and Dynamics, vol. 23, No. 5, Sep.-Oct. 2000. AIAA, Reston, VA.

Zakhari N. Khutorovsky, "Direct Method for the Analysis of Collision Probability of Artificial Space Objects in LEO: Techniques, Results and Applications", Proceedings of the First European Conference on Space Debris, Darmstadt, Germany, Apr. 5-7, 1993. (ESA SD-01).

R.P. Patera, "General Method for Calculating Satellite Collision Probability." Journal of Guidance, Control, and Dynamics, vol. 24, No. 4, pp. 716-722, AIAA Inc. Reston, VA.

* cited by examiner

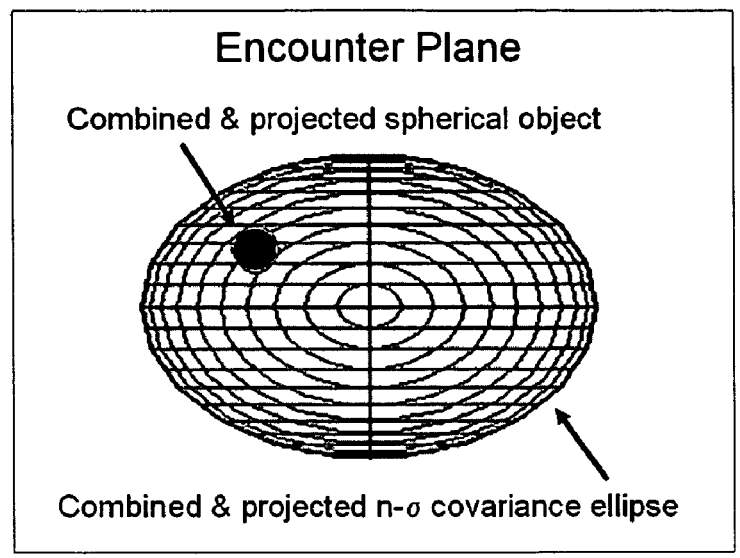
Figure 3 (Prior Art)
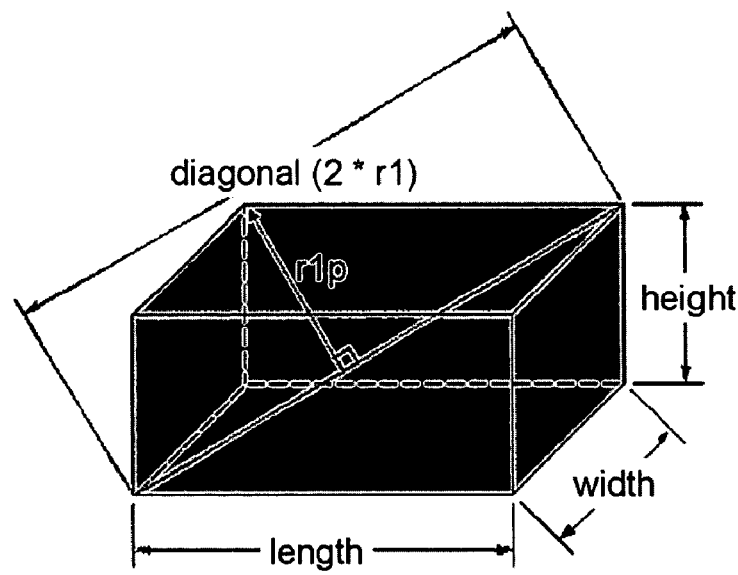
Figure 4 - Primary object projection geometry

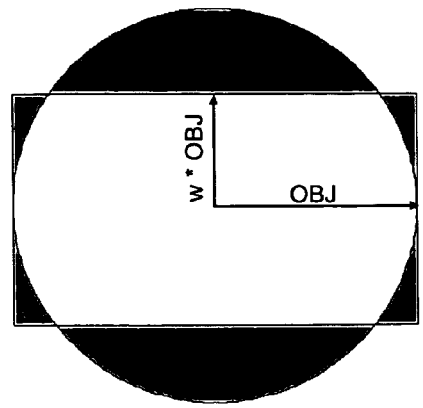
Figure 5 - Superposition of projected rectangle and circle
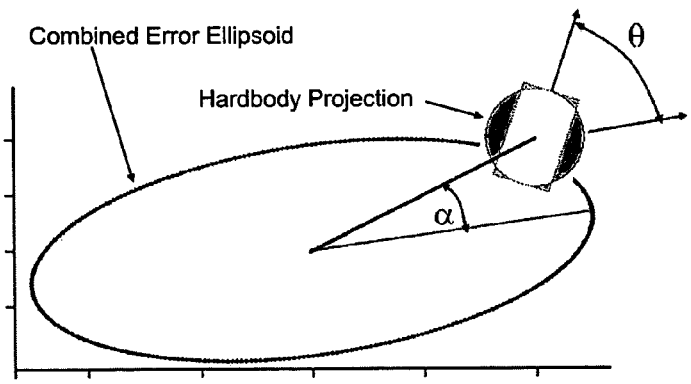
Figure 6 - Relationship of angles to major axis

US 7,383,153 B2

METHOD FOR DETERMINING MAXIMUM CONJUNCTION PROBABILITY OF RECTANGULAR-SHAPED OBJECTS

BACKGROUND OF THE INVENTION

Probability calculations for collision and impingement analysis need to ensure sufficient accuracy to give meaningful results. Because all operational decisions are ultimately made with respect to the amount of acceptable risk, the action threshold should not be based on an unacceptable miss distance or keep-out angle but rather on an unacceptable probability. NASA currently uses a risk-based approach with the International Space Station and Space Transportation System, where avoidance maneuvers are initiated if the collision probability becomes unacceptably high. If the positional uncertainty is very large, a Gaussian calculation will produce a low conjunction probability. Although mathematically correct, the resulting probability may give a false sense of confidence that a conjunction is not likely to occur. Such a low probability may, in fact, indicate that the data is not of sufficient accuracy to produce an operationally meaningful result.

For satellite tracking, the accuracy of positional covariance matrices resulting from Least Squares Orbit Determination of sparse data is questionable. Covariance matrices formed in this manner often provide overly optimistic results. Frisbee and Foster noted in "A Parametric Analysis of Orbital Debris Collision Probability and Maneuver Rate for Space Vehicles," NASA JSC 25898, August 1992, that "the primary problem with state error covariances determined from observations of objects in Earth orbit is that they are not truly reflective of the uncertainties in the dynamic environment." To address this concern, they devised a method to scale covariances provided to NASA by Air Force Space Command. The present invention provides a way to address the inaccuracy of covariance matrices by determining a mathematical upper bound that will not be exceeded regardless of positional uncertainty.

Significant work has been done to address the computing of collision and impingement probability for neighboring space objects (see FOSTER, J. L., and ESTES, H. S., "A Parametric Analysis of Orbital Debris Collision Probability and Maneuver Rate for Space Vehicles," NASA JSC 25898, August 1992; KHUTOROVSKY, Z. N., BOIKOV, V., and KAMENSKY, S. Y., "Direct Method for the Analysis of Collision Probability of Artificial Space Objects in LEO: Techniques, Results, and Applications," Proceedings of the First European Conference on Space Debris, ESA SD-01, 1993, pp. 491-508; CARLTON-WIPPERN, K. C., "Analysis of Satellite Collision Probabilities Due to Trajectory and Uncertainties in the Position/Momentum Vectors," Journal of Space Power, Vol. 12, No. 4, 1993; CHAN, K. F., "Collision Probability Analyses for Earth Orbiting Satellites," Advances in the Astronautical Sciences, Vol. 96, 1997, pp. 1033-1048; BEREND, N., "Estimation of the Probability of Collision Between Two Catalogued Orbiting Objects," Advances in Space Research, Vol. 23, No. 1, 1999, pp. 243-247; OLTROGGE, D., and GIST, R., "Collision Vision Situational Awareness for Safe and Reliable Space Operations," 50$^{th}$ International Astronautical Congress, 4-8 Oct. 1999, Amsterdam, The Netherlands, LAA-99-IAA.6.6.07; AKELLA, M. R., and ALFRIEND, K. T., "Probability of Collision Between Space Objects," Journal of Guidance, Control, and Dynamics, Vol. 23, No. 5, September-October 2000, pp. 769-772; CHAN, K. F., "Analytical Expressions for Computing Spacecraft Collision Probabilities," AAS Paper No. 01-119, AAS/AIAA Space Flight Mechanics Meeting, Santa Barbara, Calif., 11-15 Feb., 2001; PATERA, R. P., "General Method for Calculating Satellite Collision Probability," AIAA Journal of Guidance, Control, and Dynamics, Volume 24, Number 4, July-August 2001, pp. 716-722; and ALFANO, S., "Assessing the Instantaneous Risk of Direct Laser Impingement," Journal of Spacecraft and Rockets, Vol. 40, No. 5, September-October 2003, pp. 678-681).

Likewise, some work has been done to examine accuracy requirements associated with those computations (see GOTTLIEB, R. G., SPONAUGLE, S. J., and GAYLOR, D. E., "Orbit Determination Accuracy Requirements for Collision Avoidance," AAS Paper No 01-181, AAS/ALAA Space Flight Mechanics Meeting, Feb. 11-15, 2001, Santa Barbara, Calif.; and ALFANO, S., "Relating Position Uncertainty to Maximum Conjunction Probability," AAS Paper No. 03-548, AAS/AIAA Astrodynamics Specialist Conference, 3-7 Aug., 2003, Big Sky, Mont.).

Typically, one determines if and when a secondary object will transgress a user-defined safety zone. The uncertainties associated with position are represented by three-dimensional Gaussian probability densities. These densities take the form of covariance matrices. For space objects, they can be obtained from the owner-operators or independent surveillance sources such as the US Satellite Catalog (Special Perturbations). When predicting collisions, positions and covariances are propagated to the time of closest approach. Various examples of such prior art collision prediction can be found in U.S. Pat. No. 5,075,694 to Donnangelo et al., U.S. Pat. No. 5,760,737 to Brenner, U.S. Pat. No. 6,694,283 to Alfano et al., U.S. Pat. No. 6,691,034 to Patera et al. and U.S. Pat. No. 6,820,006 to Patera, the details of which are hereby incorporated by reference.

It is possible to find the absolute worst-possible covariance size and orientation that maximizes the probability for a given encounter where the object sizes and rectangular shapes are known. It is also possible to find covariance parameters that maximize the probability for various covariance shapes as determined by the aspect ratio (i.e. the ratio of major-to-minor axes of the projected combined covariance ellipse).

If the maximum probability is below a predefined action threshold, then no further calculations are needed. Such analysis can be insightful even when one only has knowledge of the miss distance and physical object sizes.

Prior art probability computation has been based upon spherical objects. There are many assumptions in this method that reduce the problem's complexity. The physical objects are treated as spheres, thus eliminating the need for attitude information, as illustrated in FIG. 1. For collision analysis, their relative motion is considered linear for the encounter by assuming the effect of relative acceleration is dwarfed by that of the velocity. The positional errors are assumed to be zero-mean, Gaussian, uncorrelated, and constant for the encounter. The relative velocity at the point of closest approach is deemed sufficiently large to ensure a brief encounter time and static covariance. The encounter region is defined when one object is within a standard deviation ($\sigma$) combined covariance ellipsoid shell scaled by a factor of n. This user-defined, three-dimensional, n-$\sigma$ shell is centered on the primary object; n is typically in the range of 3 to 8 to accommodate conjunction possibilities ranging from 97.070911% to 99.999999%.

Because the covariances are expected to be uncorrelated, they are simply summed to form one, large, combined, covariance ellipsoid that is centered at the primary object, as illustrated in FIG. 2. The secondary object passes quickly through this ellipsoid creating a tube-shaped path. A conjunction occurs if the secondary sphere touches the primary sphere, i.e. when the distance between the two projected object centers is less than the sum of their radii. The radius of this collision tube is enlarged to accommodate all possibilities of the secondary touching the primary by combining the radii of both objects.

A plane perpendicular to the relative velocity vector is formed and the combined object and covariance ellipsoid are projected onto this encounter plane. As stated previously, the encounter region is defined by an n-σ shell determined by the user to sufficiently account for conjunction possibilities. Within that shell the tube is straight and rapidly traversed, allowing a decoupling of the dimension associated with the tube path (i.e. relative velocity). The tube becomes a circle on the projected encounter plane. Likewise, the covariance ellipsoid becomes an ellipse, as illustrated in FIG. 3.

The relative velocity vector (decoupled dimension) is associated with the time of closest approach. The conjunction assessment here is concerned with cumulative probability over the time it takes to span the n-σ shell, not an instantaneous probability at a specific time within the shell. Along this dimension, integration of the probability density across the shell produces a number very near unity, meaning the close approach will occur at some time within the shell with near absolute certainty. Thus the cumulative collision probability is reduced to a two-dimensional problem in the encounter plane that is then multiplied by the decoupled dimension's probability. By rounding the latter probability to one, it is eliminated from further calculations.

The resulting two-dimensional probability equation in the encounter plane is given as $$P = \frac{1}{2 \cdot \pi \cdot \sigma_x \cdot \sigma_y} \cdot \int_{-OBJ}^{OBJ} \int_{-\sqrt{OBJ^2-y^2}}^{\sqrt{OBJ^2-y^2}} \exp\left[\left(\frac{-1}{2}\right) \cdot \left[\left(\frac{x+x_m}{\sigma_x}\right)^2 + \left(\frac{y+y_m}{\sigma_y}\right)^2\right]\right] dx\,dy \quad (1)$$

where OBJ is the combined object radius, x lies along the major axis, y lies along the minor axis, $x_m$ and $y_m$ are the respective components of the projected miss distance, and $\sigma_x$ and $\sigma_y$ are the corresponding standard deviations. For the formulation that follows, the aspect ratio AR is incorporated as a multiple of the minor axis standard deviation (AR≧1) and equation (1) is expressed as $$P = \frac{1}{2 \cdot \pi \cdot AR \cdot (\sigma_y)^2} \cdot \int_{-OBJ}^{OBJ} \int_{-\sqrt{OBJ^2-y^2}}^{\sqrt{OBJ^2-y^2}} \exp\left[\left(\frac{-1}{2}\right) \cdot \left[\left(\frac{x+x_m}{AR \cdot \sigma_y}\right)^2 + \left(\frac{y+y_m}{\sigma_y}\right)^2\right]\right] dx\,dy \quad (2)$$

The above equations are also valid for determining the probability of instantaneous line-of-sight impingement. For these instances, the encounter plane is defined perpendicular to the line-of-sight vector and the combined object and covariance ellipsoids projected onto this plane. The axis associated with the line-of-sight vector is then eliminated from the probability calculation. The encounter region is again defined by an n-σ shell determined by the user to sufficiently account for impingement possibilities. As with collision assessment, the instantaneous impingement probability becomes a two-dimensional problem in the encounter plane using equation (2). For the formulation that follows, equation (2) is rewritten as $$P = \frac{OBJ^2}{2 \cdot \pi \cdot AR \cdot (\sigma_y)^2} \cdot \int_{-1}^{1} \int_{-\sqrt{1-y^2}}^{\sqrt{1-y^2}} \exp\left[\left(\frac{-1}{2}\right) \cdot \left[\left(\frac{x_m + x \cdot OBJ}{AR \cdot \sigma_y}\right)^2 + \left(\frac{y_m + y \cdot OBJ}{\sigma_y}\right)^2\right]\right] dx\,dy \quad (3)$$

BRIEF SUMMARY OF THE INVENTION

The present invention determines the maximum collision probability for two conjuncting objects of rectangular shape. It uses the object dimensions and relative miss distance at the point of closest approach, coupled with the aspect ratio of the projected, combined covariance to determine the size/orientation of the covariance as well as the object orientation that produces the maximum probability. Additionally the method provides the associated standard deviation which defines the boundary of a probability dilution region. This region is used to assess the sufficiency of the data to support a true (as opposed to maximum) probability assessment. It can also be used to determine a risk-based keep-out region to provide warning of an impending collision.

It is an aspect of the present invention to provide an upper bound on collision probability for worst-case analysis given sufficiently accurate object positional data.

It is another aspect of the present invention to provide an upper bound on collision probability for worst-case analysis when object positional data is insufficient, inadequate, or nonexistent.

It is yet another aspect of the present invention to provide an upper bound on laser or radio-frequency impingement probability for worst-case analysis given sufficiently accurate object positional data.

It is a further aspect of the present invention to provide an upper bound on laser or radio-frequency impingement probability for worst-case analysis when object positional data is insufficient, inadequate, or nonexistent.

It is also an aspect of the present invention to provide the combined covariance size and orientation for a specified ratio of the projected, major-to-minor, covariance ellipse axes.

It is another aspect of the present invention to provide a quantifiable measure of accuracy (standard deviation of minor axis) as a boundary for the probability dilution region.

It is yet another aspect of the present invention to provide a risk-based keep-out region to provide warning of impending collision or impingement, It is a further aspect of the present invention to provide the means to determine when a probability calculation is specious.

BRIEF DESCRIPTION OF THE DRAWINGS

FIG. 3 illustrates a prior art encounter plane projection;

FIG. 4 illustrates a primary object projection geometry in accordance with an embodiment of the present invention;

FIG. 5 illustrates an overlay of the projected rectangle on the projected circle in accordance with an embodiment of the present invention;

FIG. 6 illustrates the relationship of angles α and θ to major axis after projection onto encounter plane in accordance with an embodiment of the present invention;

DETAILED DESCRIPTION OF THE INVENTION

Figure 1:
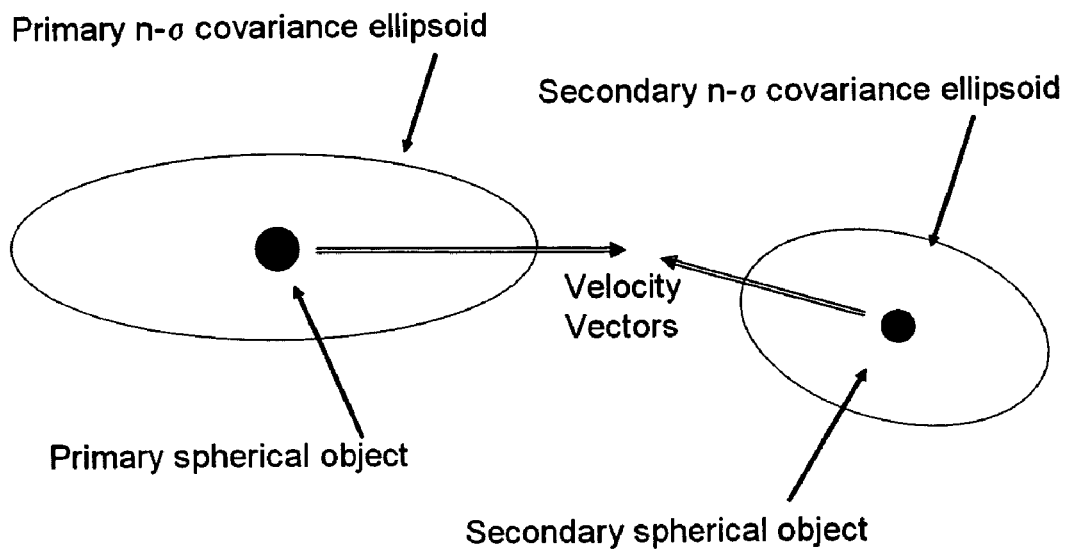
FIG. 1 illustrates the prior art computational method based upon spherical objects.
Figure 2:
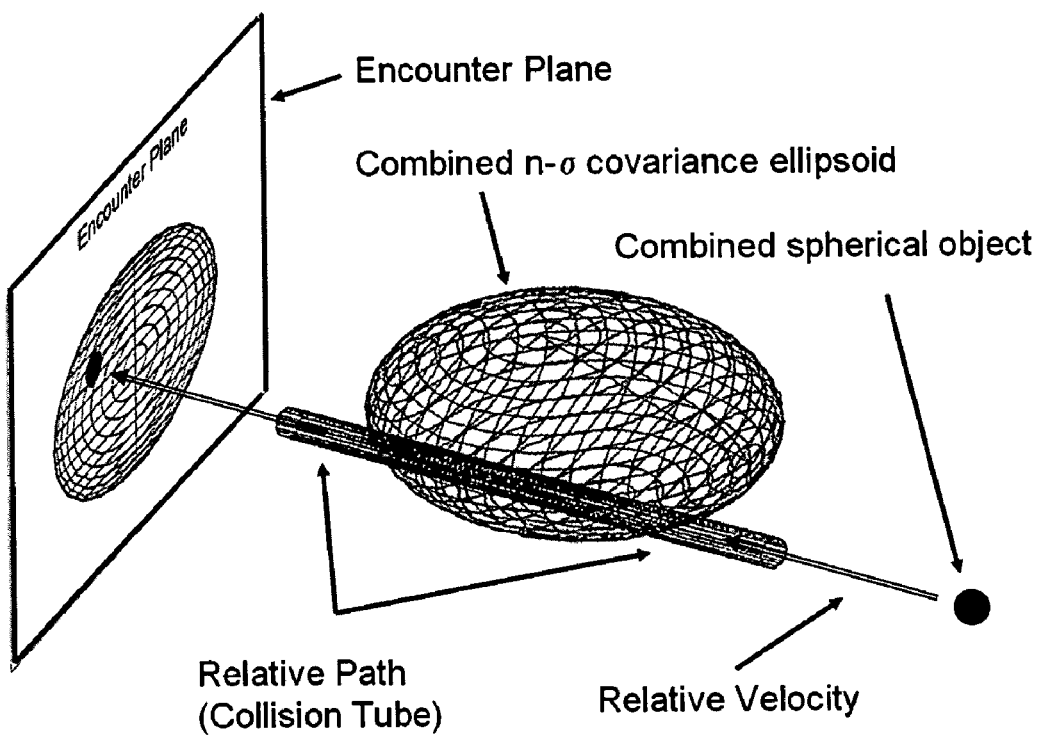
FIG. 2 illustrates a prior art model of conjunction encounter visualization and reduction.

To perform probability computations for rectangular objects, a two-dimensional rectangle can be formed from the three-dimensional hard body object dimensions of height (ht), width (wd), and length (lt) such that all possible combinations of projection and attitude are completely captured. For the following analysis the dimensions are ordered so that $lt \geq wd \geq ht$. The all encompassing rectangle has the dimensions shown in FIG. 4.

One-half of the diagonal for the rectangular solid object is denoted as $r_1$.

$$r_1 = \frac{\sqrt{(lt_1)^2 + (wd_1)^2 + (ht_1)^2}}{2} \quad (4)$$

From geometrical considerations, the greatest half-width ($r_{1p}$) perpendicular to $r_1$ is $$r_{1p} = lt_1 \cdot \sqrt{1 - \left(\frac{lt_1}{2 \cdot r_1}\right)^2} \quad (5)$$

Similarly, the half-length ($r_2$) of the secondary object's largest projected rectangle dimension is $$r_2 = \frac{\sqrt{(lt_2)^2 + (wd_2)^2 + (ht_2)^2}}{2} \quad (6)$$

and the half-width ($r_{2p}$) perpendicular to $r_2$ is $$r_{2p} = lt_2 \cdot \sqrt{1 - \left(\frac{lt_2}{2 \cdot r_2}\right)^2} \quad (7)$$

The combined object radius (OBJ) is defined as $$OBJ = r_1 + r_2 \quad (8)$$

and the width factor (w) is $$w = \frac{\min(r_{1p} + r_2, r_1 + r_{2p})}{OBJ} \quad (9)$$

FIG. 5 shows the overlay of the projected rectangle on the projected circle. The combined object must be contained in both spaces, meaning the shaded areas can be eliminated.

Because the orientation of the resulting projection is unknown, it must now be rotated through an angle θ measured from the combined-covariance ellipse major axis. This is done to produce the largest collision probability for the given location ($x_m$, $y_m$) and associated, combined-covariance standard deviations ($\sigma_x$, $\sigma_y$) in the projected frame. As a function of θ the probability equation (2) takes the form $$P = \frac{OBJ^2}{2 \cdot \pi \cdot AR \cdot (\sigma_y)^2} \cdot \quad (10)$$

$$\int_{-w}^{w} \int_{-\sqrt{1-y^2}}^{\sqrt{1-y^2}} \exp\left[\left(\frac{-1}{2}\right) \cdot \left[\left[\frac{x_m + (x \cdot \cos(\theta) + y \cdot \sin(\theta)) \cdot OBJ}{AR \cdot \sigma_y}\right]^2 + \left[\frac{y_m + (y \cdot \cos(\theta) - x \cdot \sin(\theta)) \cdot OBJ}{\sigma_y}\right]^2\right]\right] dx\, dy$$

Equation (10) differs from (3) in two areas. The limits of integration now reflect the rectangular nature of the objects. Also, the exponential expression is more complex because the combined object footprint reflected in FIG. 5, unlike the circle, is not universally symmetric.

The maximum collision probability computation in accordance with an embodiment of the present invention determines the worst-case scenario by finding the combined Gaussian probability density and combined object orientation that maximizes probability. The only parameters required are the relative distance (dist) of the two objects, their dimensions (ht, wd, lt), and the ratio of major-to-minor projected covariance ellipse axes (AR). The major axis of the combined covariance ellipse is aligned with the relative position vector such that it passes through the center of the combined object. The projected, combined object has its probability mass distributed symmetrically about the major axis. This means that only a single axis length needs to be examined to maximize the probability, the other being determined from the aspect ratio.

Clearly, if the combined object footprint contains the covariance ellipsoid center, the minor axis' standard deviation can be chosen to drive the maximum probability to one. For spherical objects this occurs when the predicted miss distance is less than the combined object size (dist<OBJ). This is the limiting case and need not be addressed; it is inferred that a decision maker faced with such a predicted "direct hit" would not need a probability calculation. The method described here only applies when the combined object does not encompass the covariance center (dist≧OBJ). Given the object dimensions and distance from center, the minor axis size can be determined by maximizing the two-dimensional probability expression. Once determined, the worst-case collision probability is calculated.

Small changes in the combined covariance can result in significant changes in the probability. In the absence of additional (more accurate) data or refinements in position determination, it is assumed that the general shape of the projected covariance ellipse is correct although its size and orientation might not be. A new angle (α is introduced to define the orientation of the distance vector with respect to the covariance ellipse major axis. For a specified miss distance, combined object size, and width factor, the projected covariance size and relative orientation are varied along with object orientation to produce the maximum collision probability while holding the covariance aspect ratio. Thus the values of θ, α, and $\sigma_y$ must be found that produce the largest probability. The angle α is illustrated in FIG. 6 along with the orientation angle of the projected object (θ) as measured from the ellipse's major axis. As such, FIG. 6 illustrates the relationship of angles θ and α to major axis after projection onto encounter plane.

The probability equation as a function of α and θ becomes $$P = \frac{OBJ^2}{2 \cdot \pi \cdot AR \cdot (\sigma_y)^2} \cdot \int_{-w}^{w} \int_{-\sqrt{1-y^2}}^{\sqrt{1-y^2}} \exp \left[ \left( \frac{-1}{2} \right) \cdot \left[ \left[ \frac{dist \cdot \cos(\alpha) + (x \cdot \cos(\theta) + y \cdot \sin(\theta)) \cdot OBJ}{AR \cdot \sigma_y} \right]^2 + \left[ \frac{dist \cdot \sin(\alpha) + (y \cdot \cos(\theta) - x \cdot \sin(\theta)) \cdot OBJ}{\sigma_y} \right]^2 \right] \right] dx\, dy \quad (11)$$

The maximum collision probability occurs at the closest approach point when the relative position vector is aligned with the major axis of the combined covariance ellipse (α equals zero) coincident with the object's probability mass symmetrically distributed about the major axis (θ equals zero). It can readily be shown that under these conditions, the first derivative with respect to each angle is zero and their second derivatives are negative. The maximum collision probability for a given covariance size ($\sigma_y$) and shape (AR) is therefore simplified to $$P_{max} = \frac{OBJ^2}{2 \cdot \pi \cdot AR \cdot (\sigma_y)^2} \cdot \int_{-w}^{w} \int_{-\sqrt{1-y^2}}^{\sqrt{1-y^2}} \exp \left[ \left( \frac{-1}{2} \right) \cdot \left[ \left( \frac{dist + x \cdot OBJ}{AR \cdot \sigma_y} \right)^2 + \left( \frac{y \cdot OBJ}{\sigma_y} \right)^2 \right] \right] dx\, dy \quad (12)$$

With θ equaling zero to optimize the object orientation and α equaling zero to optimize the relative distance direction, the final step determines the size of the projected covariance that maximizes equation (12). The derivative of equation (12) is taken with respect to $\sigma_y$ and the resulting exponential function in the integrand approximated to zeroth order. The resulting double integral is set equal to zero to determine the value of $\sigma_y$ that maximizes the probability. This zero-order approximation ($\sigma_{y0}$) becomes $$\sigma_{y0} = \frac{OBJ}{2 \cdot AR} \cdot \sqrt{\frac{[(1 - 3 \cdot AR^2) \cdot w \cdot (\sqrt{1-w^2})^3]}{3 \cdot (w \cdot \sqrt{1-w^2} + a\sin(w))} + \left[ \frac{(AR^2 + 1)}{2} + 2 \cdot \left( \frac{dist}{OBJ} \right)^2 \right]} \quad (13)$$

The value of the above expression can be used in equation (12) to initialize $\sigma_y$. Iteration on $\sigma_y$ is then performed to find the maximum collision probability within the bounds of user tolerance.

A case of interest involves an infinite aspect ratio (AR=∞). For this case, the combined object radius is normalized with respect to the miss distance:

$$r = \frac{OBJ}{dist} \quad (14)$$

The covariance ellipsoid is constructed such that the combined object contains all the probability mass associated with the minor axes. The probability P for the remaining axis is reduced to $$P = \frac{1}{\sqrt{2\pi} \cdot \sigma_u} \cdot \int_{1-r}^{1+r} \exp \left[ \frac{-1}{2} \cdot \frac{u^2}{(\sigma_u)^2} \right] du \quad (15)$$

where $\sigma_u$ is the normalized standard deviation. Equation 30 can be expressed in an alternate form using error functions $$P = \frac{1}{2} \cdot \text{erf} \left[ \frac{1}{2} \cdot (1+r) \cdot \frac{\sqrt{2}}{\sigma_u} \right] + \frac{1}{2} \cdot \text{erf} \left[ \frac{1}{2} \cdot (-1+r) \cdot \frac{\sqrt{2}}{\sigma_u} \right]. \quad (16)$$

Probability is maximized by $$\frac{dP}{d\sigma_u} = 0. \quad (17)$$

The result is a very simple expression for $\sigma_u$ in terms of r.

$$\sigma_u = \sqrt{\frac{-2 \cdot r}{\ln \left[ \frac{(1-r)}{(1+r)} \right]}}. \quad (18)$$

Substitution of equation (18) into (16) produces the algebraic expression $$P_{max} = \frac{1}{2} \cdot \left[ \text{erf} \left[ \frac{(r+1)}{2 \cdot \sqrt{r}} \cdot \sqrt{-\ln \left[ \frac{(1-r)}{(1+r)} \right]} \right] + \text{erf} \left[ \frac{(r-1)}{2 \cdot \sqrt{r}} \cdot \sqrt{-\ln \left[ \frac{(1-r)}{(1+r)} \right]} \right] \right]. \quad (19)$$

The length of the single axis has been optimized to produce the greatest overall probability. The reader is reminded that $\sigma_u$ is a normalized value and should be multiplied by dist to produce $\sigma_x$.

Due to the near-linear nature of the previous equation, $P_{max}$ can be approximated to at least three significant figures with the following equations:

$$P\text{max} = 0.48394 \cdot (r)(r < 0.8) \quad (20)$$

$$P\text{max} = 0.21329 \cdot \exp(1.01511 \cdot r) - 0.09025 (0.8 \leq r < 1.0) \quad (21)$$

For the limiting case where r=1, $P_{max}$ is 0.5. Equation (20) or (21) can easily be employed for computational prescreening.

As the aspect ratio grows, so does $P_{max}$. To properly assess the maximum probability, it is recommended that the reader not use equation (20) or (21) for anything other than prescreening unless it is certain that the encounter's aspect ratio is near infinity (AR>1000). It is obviously desirable to use the most representative covariances possible, thus ensuring the correct aspect ratio for each and every conjunction. Using a default aspect ratio of 40 is sufficient to capture over 99% of orbital conjunctions but will cause the maximum probability to be over-inflated for many of those conjunctions. Although not ideal, this may be the best assessment possible if the covariance data is insufficient or not available.

Figure 7:
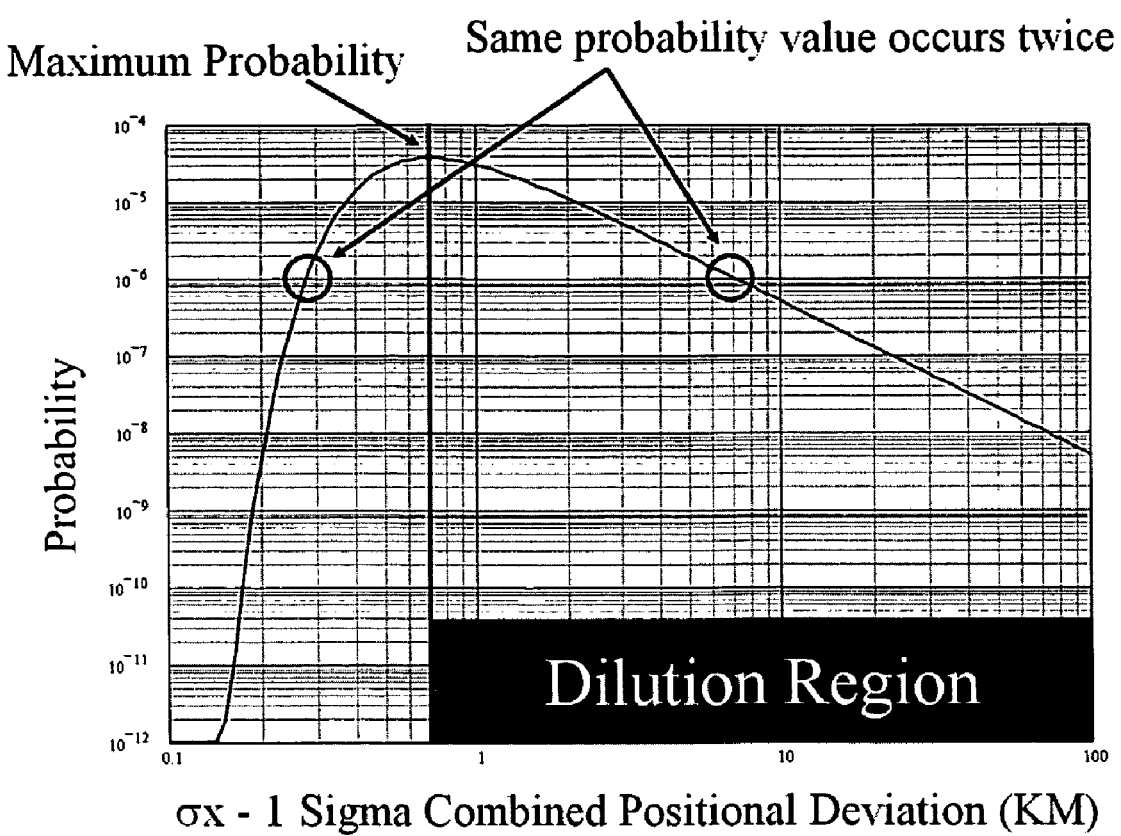
FIG. 7 illustrates the dilution region defined for a notional encounter in accordance with an embodiment of the present invention.

The present construct involves a region of probability dilution. For fixed object sizes and miss distance, the $\sigma_x$ that produces $P_{max}$ defines the dilution region boundary, as shown in FIG. 7. To the left of the vertical line, greater positional accuracy (smaller $\sigma_x$) decreases collision probability. To the right of the vertical line, lesser positional accuracy (greater $\sigma_x$) also decreases collision probability. Both good and poor quality data can produce the same probability ($10^{-6}$ is given as an example in FIG. 7). Although both calculations are mathematically correct, only the former is operationally meaningful.

The probability dilution region is that region where the standard deviation of the combined covariance minor axis ($\sigma_y$) exceeds that which yields $P_{max}$. If operating outside this dilution region (left of vertical line) it is reasonable to associate low probability with low risk. If operating within the dilution region, then the further into this region the uncertainty progresses the more unreasonable it becomes to associate low probability with low risk. If the positional uncertainty is large enough, the resulting low probability may mislead the user into thinking the encounter poses little or no threat. Therefore, a low probability in the dilution region may be the result of poor quality data and should be treated accordingly.

The dilution region boundary should be used to determine the minimum accuracy requirement for a meaningful probability assessment. When calculating true probability from equation (1), the reader is advised to always consider this region. If the positional data is not of sufficient quality to avoid this region, then get better (more accurate) data and reassess the true probability. If better data is not available or still insufficient, consider using the maximum probability as opposed to the true one. This will ensure that a decision maker is not lulled into a false sense of security by a low probability calculation that is specious.

Formulations for maximum probability and its associated standard deviation were derived. To maximize the probability for any aspect ratio, the major axis of the combined covariance ellipse must pass through the center of the combined object with the object's probability mass distributed symmetrically about that axis. Given the object dimensions and relative distance, the size of the combined covariance minor axis is determined by maximizing a two-dimensional probability expression. Once determined, the worst-case collision probability can be calculated. An aspect ratio of 40 will capture over 99% of all orbital conjunction possibilities. The analytical approximation for an infinite aspect ratio captures all possibilities. Using an all-encompassing aspect ratio (as opposed to the exact one) may cause the maximum probability to be over-inflated. Although not ideal, this may be the best assessment possible if the covariance data is insufficient or not available.

The region of probability dilution is also defined. In this region low probability does not necessarily indicate low risk. A large positional uncertainty can yield a low probability which may mislead the user into thinking the encounter poses little or no threat. If in this region, it is recommended that the user obtain better (more accurate) data and reassess the probability. If this cannot be done, decisions should be based on the maximum probability as opposed to the true probability.

To compute the maximum probability, the only parameters required are the distance between the objects at the point of closest approach, the dimensions of the objects, and the assumed ratio of the projected major and minor combined covariance ellipse axes. Such analysis can be helpful when one lacks knowledge of positional uncertainties or to address hypothetical scenarios.

Figure 8:
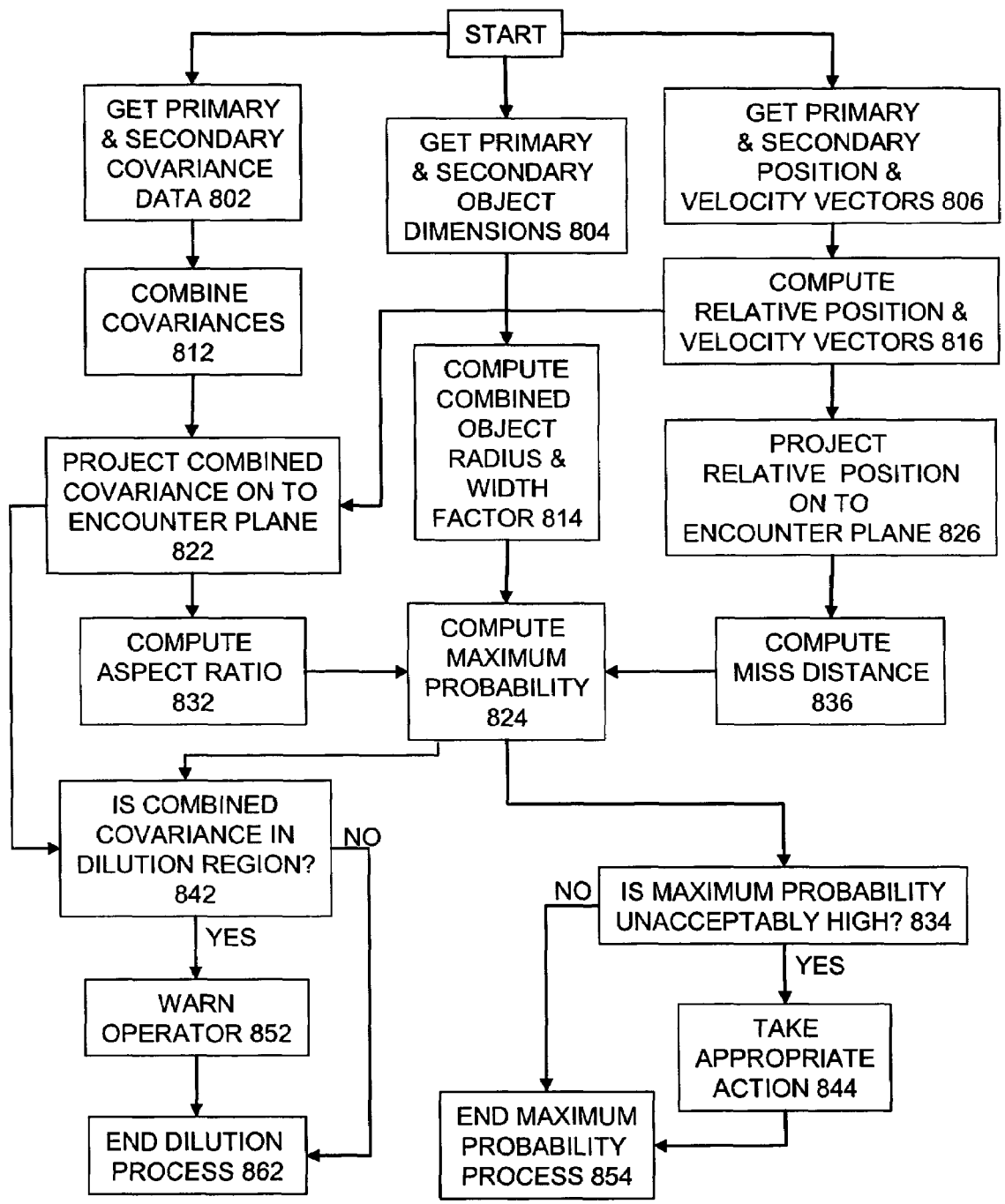
FIG. 8 illustrates a flowchart for collision computation at point of closest approach if covariance data is available in accordance with an embodiment of the present invention.

As illustrated in FIG. 8, in one embodiment of a method in accordance with the present invention, the process provides collision computation at a point of closest approach when covariance data is available. In this process, the first steps are getting the primary and secondary covariance data 802 for the primary and secondary objects, respectively, getting the primary and secondary object dimensions 804, and getting the primary and secondary position and velocity vectors 806. The next steps combine the primary and secondary data by combining the covariances at 812, computing the combined object radius and width factor at 814, and computing relative position and velocity vectors at 816.

The combined covariance from 812 and relative vectors from 816 are used to project the combined covariance onto the encounter plane, at 822, and the result is used to compute the aspect ratio at 832. The relative vectors from 816 are also used to project the relative position onto the encounter plane, at 826, which is used to compute a miss distance at 836. The aspect ratio from 832, combined object radius and width factor from 814, and miss distance from 836 are then used to compute the maximum probability of collision $P_{max}$ at 824.

The combined covariance projected on the encounter plane from 822 and the maximum probability from 824 are used to determine if the combined covariance is in the dilution region, at 842. If so, the operator is warned at 852 and the dilution process is ended at 862. If the combined covariance is not in the dilution region at 842, the dilution process is ended at 862 (without the warning). The maximum probability from 824 is also checked at 834 to see if it is unacceptably high. If so, the process can take appropriate action at 844, such as collision avoidance maneuvers, prior to ending the maximum probability process at 854. If the maximum probability is not unacceptably high, the maximum probability process is ended at 854.

Figure 9:
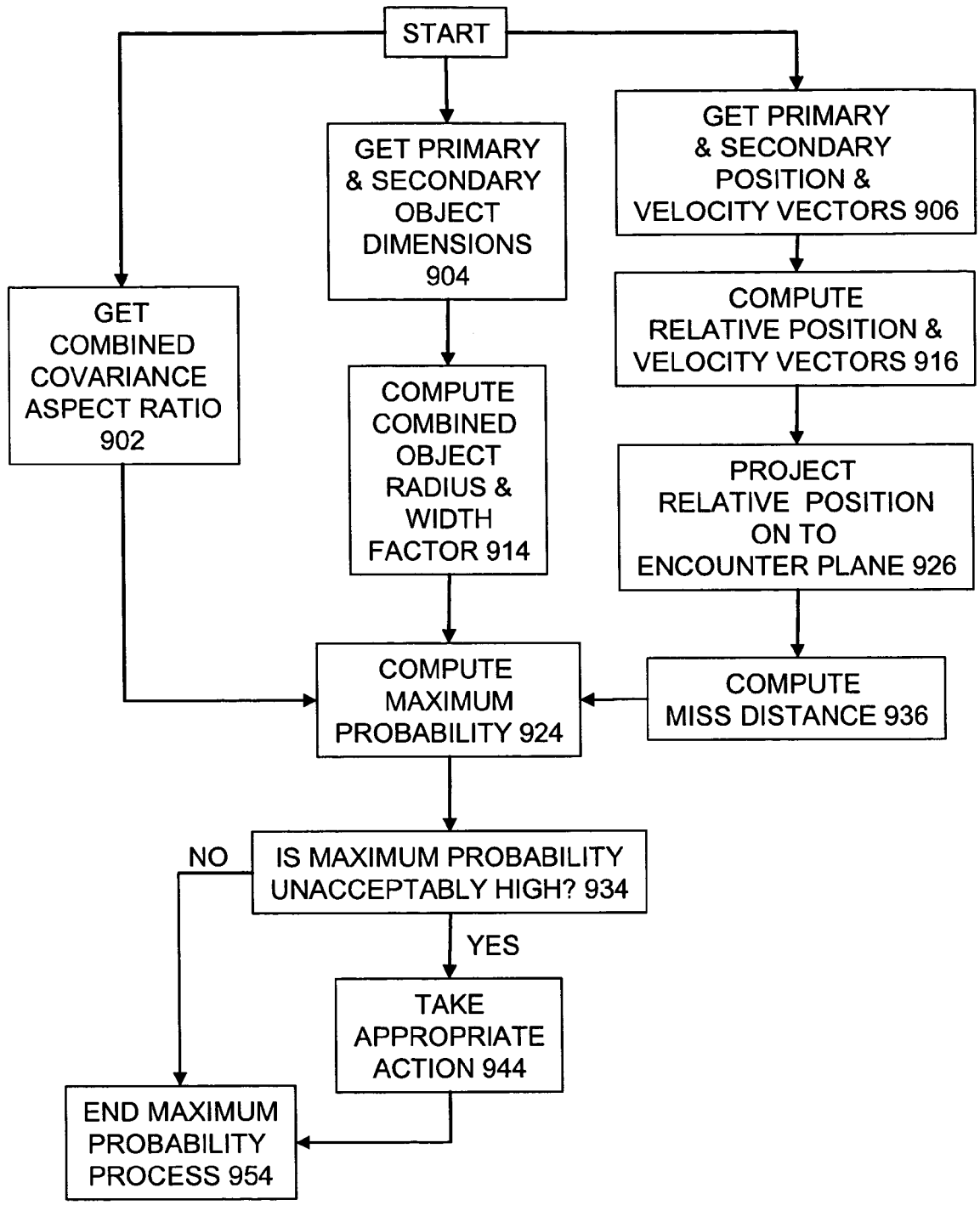
FIG. 9 illustrates a flowchart for collision computation at point of closest approach if covariance data is not available in accordance with an embodiment of the present invention.

FIG. 9 illustrates an embodiment of a method in accordance with the present invention for collision computation at a point of closest approach when covariance data is not available. Much like the process of FIG. 8, the first steps are getting a combined covariance aspect ratio 902, getting the primary and secondary object dimensions 904, and getting the primary and secondary position and velocity vectors 906. Any suitable means can be used to get the combined covariance aspect ratio at step 902 when the covariance data is not available. Typically, the operator will input a reasonable combined covariance aspect ratio based on one of various suitable methods. In a first method, the combined covariance aspect ratio is set as AR=1. This option assumes equal uncertainty in all axes, but may under-inflate the probability. This is the method used in the SOCRATES (Satellite Orbital Conjunction Reports Assessing Threatening Encounters in Space) project, as explained in the web page at http://celestrak.com/SOCRATES/. A second method sets AR="best guess" as deduced from historical covariance data if current data is not available. This method, however, may not be representative of current conditions. A third possible method is to set AR=40 to capture 99% of all possibilities, as discussed earlier herein, but this may over-inflate the probability. Yet another suitable method is to set AR=infinity to capture all possibilities using Eq (20) or (21), as discussed above. This method may also over-inflate the probability and, as previously discussed herein, while not ideal, it may be the best method possible under the circumstances. The decision of which method to use should be left to the operator, but may also be automated based on a suitable decision algorithm.

The next steps compute the combined object radius and width factor at 914 and compute the relative position and velocity vectors at 916. The relative vectors from 916 are used to project the relative position onto the encounter plane, at 926, which is used to compute a miss distance at 936. The combined covariance aspect ratio from 902, combined object radius and width factor from 914, and miss distance from 936 are then used to compute the maximum probability of collision $P_{max}$ at 924. The maximum probability is then checked at 934 to see if it is unacceptably high. If so, the process can take appropriate action at 944, such as collision avoidance maneuvers, prior to ending the maximum probability process at 954. If the maximum probability is not unacceptably high, the maximum probability process is ended at 954.

Figure 10:
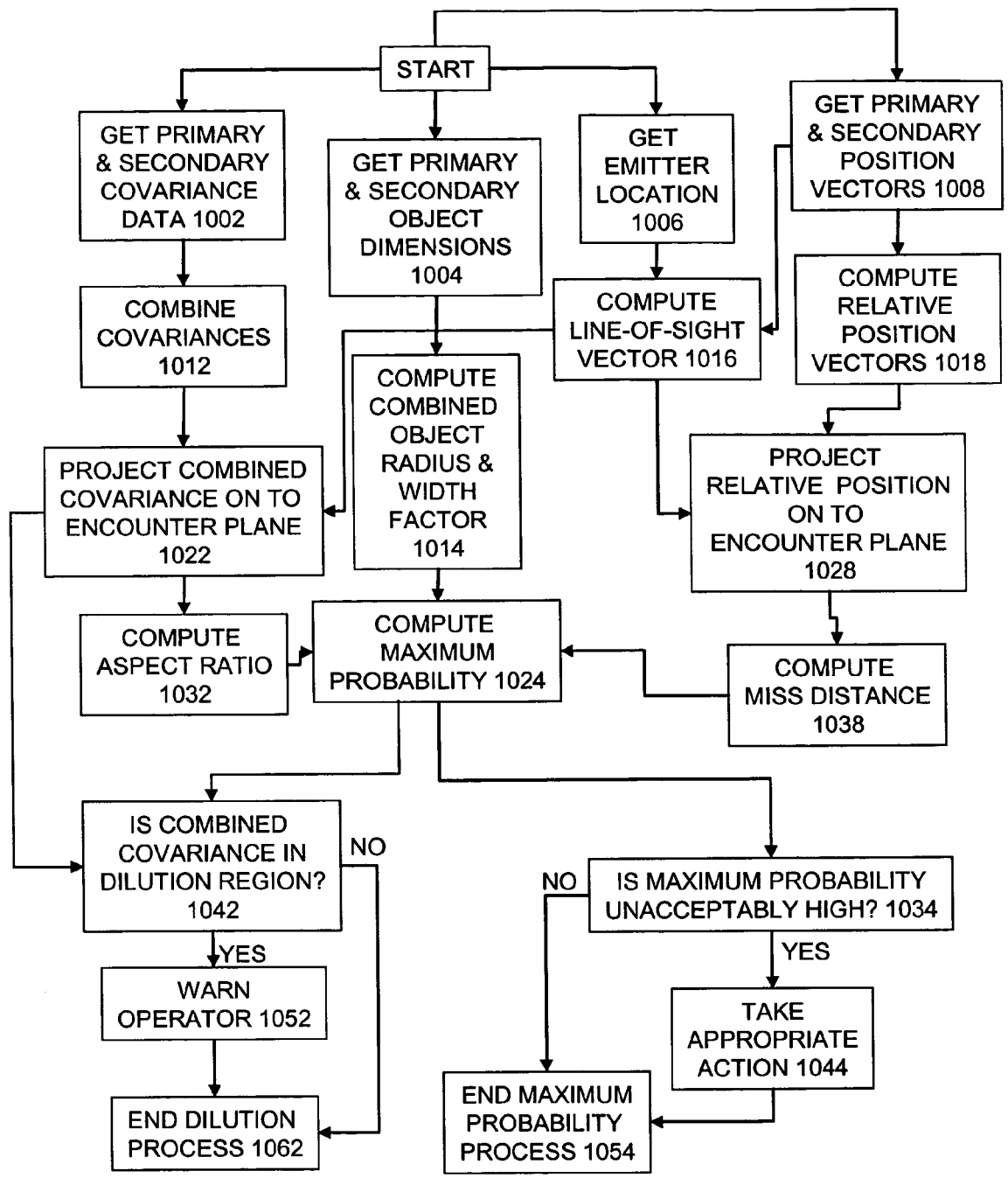
FIG. 10 illustrates a flowchart for instantaneous line-of-sight impingement computation if covariance data is not available in accordance with an embodiment of the present invention.

In a manner similar to the collision computation embodiments, the present invention can also be used for instantaneous line-of-sight impingement computation. As illustrated in FIG. 10, in one embodiment of a method in accordance with the present invention, the process provides instantaneous line-of-sight impingement computation when covariance data is available. In this process, the first steps are getting the primary and secondary covariance data 1002 for the primary and secondary objects, respectively, getting the primary and secondary object dimensions 1004, getting an emitter location 1006, and getting the primary and secondary position vectors 1008. The next steps combine the primary and secondary data by combining the covariances at 1012, compute the combined object radius and width factor at 1014, compute the line-of-sight vector 1016 based upon the emitter location from 1006 and the position vectors from 1008, and computing relative position and velocity vectors at 1018.

The combined covariance from 1012 and line-of-sight vector from 1016 are used to project the combined covariance onto the encounter plane, at 1022, and the result is used to compute the aspect ratio at 1032. The relative position vectors from 1018 are also used in combination with the line-of-sight vector from 1016 to project the relative position onto the encounter plane, at 1028, which is used to compute a miss distance at 1038. The aspect ratio from 1032, combined object radius and width factor from 1014, and miss distance from 1038 are then used to compute the maximum probability of line-of-sight impingement $P_{max}$ at 1024.

The combined covariance projected on the encounter plane from 1022 and the maximum probability from 1024 are used to determine if the combined covariance is in the dilution region, at 1042. If so, the operator is warned at 1052 and the dilution process is ended at 1062. If the combined covariance is not in the dilution region at 1042, the dilution process is ended at 1062 (without the warning). The maximum probability from 1024 is also checked at 1034 to see if it is unacceptably high. If so, the process can take appropriate action at 1044, such as collision avoidance maneuvers, prior to ending the maximum probability process at 1054. If the maximum probability is not unacceptably high, the maximum probability process is ended at 1054.

Figure 11:
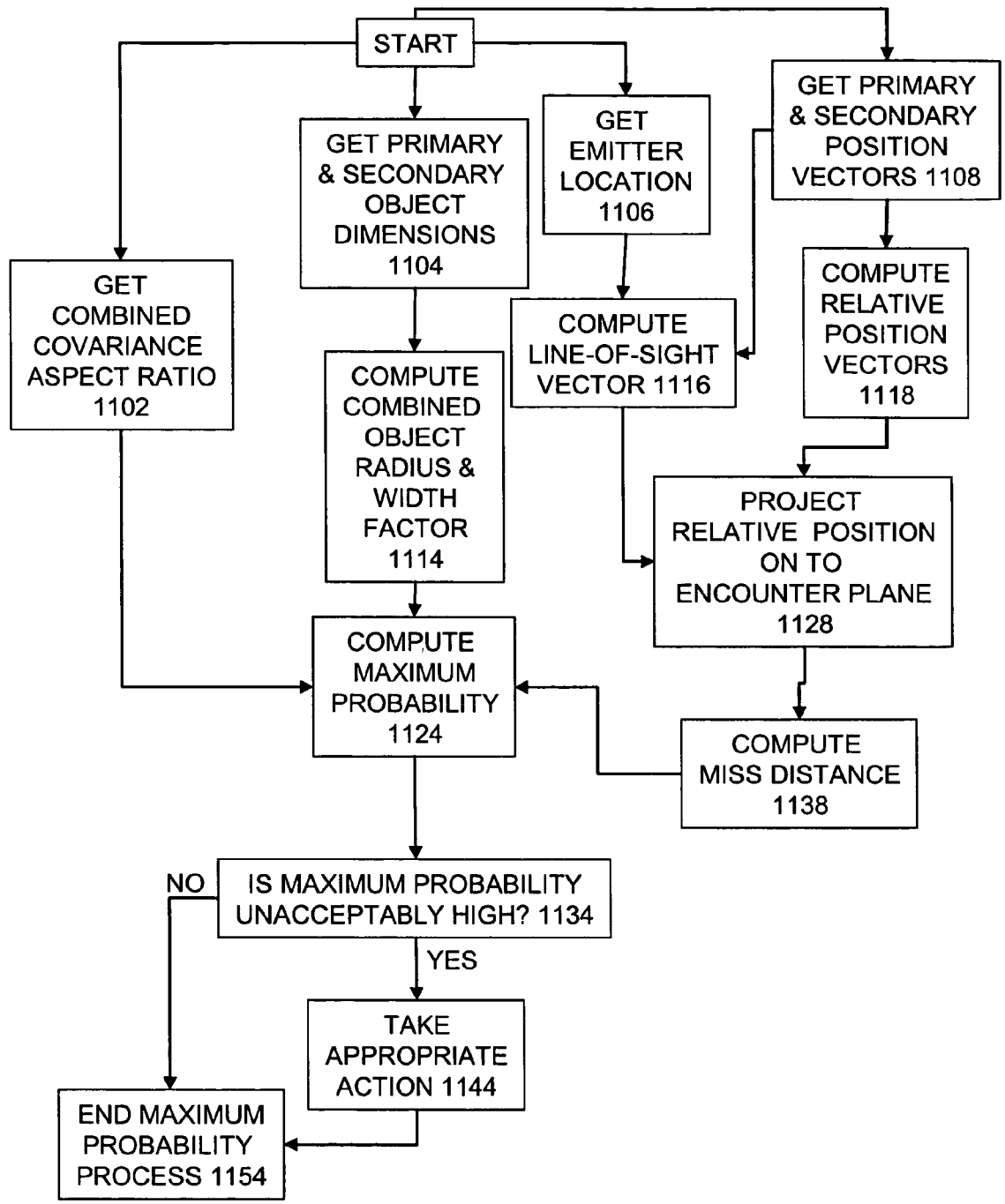
FIG. 11 illustrates a flowchart for instantaneous line-of-sight impingement computation if covariance data is not available in accordance with an embodiment of the present invention.

FIG. 11 illustrates an embodiment of a method in accordance with the present invention for line-of-sight impingement computation when covariance data is not available. Much like the process of FIG. 10, the first steps are getting a combined covariance aspect ratio 1102 (using one of the methods described above with respect to step 902), getting the primary and secondary object dimensions 1104, getting the emitter location 1106, and getting the primary and secondary position vectors 1108. The next steps compute the combined object radius and width factor at 1114, compute the line-of-sight vector at 1116, and compute the relative position vectors at 1118.

The relative vectors from 1118 are used in combination with the line-of-sight vector from 1116 to project the relative position onto the encounter plane, at 1128, which is used to compute a miss distance at 1138. The combined covariance aspect ratio from 1102, combined object radius and width factor from 1114, and miss distance from 1138 are then used to compute the maximum probability of line-of-sight impingement $P_{max}$ at 1124. The maximum probability is then checked at 1134 to see if it is unacceptably high. If so, the process can take appropriate action at 1144, such as collision avoidance maneuvers, prior to ending the maximum probability process at 1154. If the maximum probability is not unacceptably high, the maximum probability process is ended at 1154.

The present invention can advantageously be used to predict the maximum risk of spacecraft collisions, determine accuracy requirements for probability calculations in predicting satellite collisions, predict the maximum risk of aircraft collisions, determine accuracy requirements for probability calculations in predicting aircraft collisions, predict the maximum risk of laser or radio-frequency impingement, and determine accuracy requirements for probability calculations in predicting laser or radio-frequency impingement.

The invention disclosed herein extends the concept of true probability to maximum probability for collision prediction. It accounts for the rectangular nature of the objects even in the absence of attitude information, extending the state-of-the-art beyond treating objects merely as spheres. Embodiments of the present invention can also be used to assess the accuracy of positional data to determine collision warning system accuracy requirements and the reasonableness of subsequent probability calculations.

As an example of the present invention, on Jul. 7, 2004, the existing state-of-the-art method of SOCRATES predicted a conjunction between COSMOS 367 (NORAD ID 04564) and IMAGE (NORAD ID 26113). The time of closest approach was forecast to be Jul. 11, 2004, at 09:22:09.919 Greenwich Mean Time with a miss distance of 801 meters and a maximum collision probability of 0.07419. The COSMOS 367 spacecraft is 10 meters long, 5.3 meters wide and 1.3 meters tall, while the IMAGE spacecraft is 20 meters tall with four, symmetric radial antennae that extend 250 meters. The SOCRATES method continues to model the IMAGE object as a sphere with a 500 meter diameter. However, modeling this spacecraft in accordance with the present invention with a rectangle-based width ratio of 0.13 resulted in a refinement of the maximum collision probability, reducing it over tenfold to 0.00656.

A system and method for determining maximum conjunction probability of rectangular-shaped objects for use in spatial collision detection, line-of-sight impingement, and avoidance have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for determining maximum conjunction probability of rectangular-shaped objects, comprising:
   getting primary and secondary object dimensions ht, wd, lt where lt≧wd≧ht;
   computing a combined object radius OBJ as $$OBJ = r_1 + r_2$$

where one-half of a diagonal for a rectangular solid encompassing the primary object is denoted as $r_1$, where $$r_1 = \frac{\sqrt{(lt_1)^2 + (wd_1)^2 + (ht_1)^2}}{2}$$

and a greatest half-width ($r_{1p}$) perpendicular to $r_1$ is $$r_{1p} = lt_1 \cdot \sqrt{1 - \left(\frac{lt_1}{2 \cdot r_1}\right)^2}$$

one-half of a diagonal for a rectangular solid encompassing the secondary object is denoted as $r_2$, where $$r_2 = \frac{\sqrt{(lt_2)^2 + (wd_2)^2 + (ht_2)^2}}{2}$$

and a half-width ($r_{2p}$) perpendicular to $r_2$ is $$r_{2p} = lt_2 \cdot \sqrt{1 - \left(\frac{lt_2}{2 \cdot r_2}\right)^2};$$

computing a width factor (w) as $$w = \frac{\min(r_{1p} + r_2, r_1 + r_{2p})}{OBJ};$$

projecting relative positions of the primary and secondary objects onto an encounter plane to compute a miss distance (dist);
   obtaining a combined covariance aspect ratio (AR); and
   computing a maximum conjunction probability ($P_{max}$) as $$P_{max} = \frac{OBJ^2}{2 \cdot \pi \cdot AR \cdot (\sigma_y)^2} \cdot$$

$$\int_{-w}^{w} \int_{-\sqrt{1-y^2}}^{\sqrt{1-y^2}} \exp\left[\left(\frac{-1}{2}\right) \cdot \left[\left(\frac{dist + x \cdot OBJ}{AR \cdot \sigma_y}\right)^2 + \left(\frac{y \cdot OBJ}{\sigma_y}\right)^2\right]\right] dx\, dy$$

where x and y are variables of integration in the encounter plane such that x lies along a major axis of the combined object radius OBJ, y lies along a minor axis of the combined object radius OBJ, and $\sigma_y$ is a covariance standard deviation along the minor axis in the encounter plane.

2. The method of claim 1, wherein, when covariance data is available, the method further comprising:
   obtaining the combined covariance aspect ratio (AR) by:
     getting primary and secondary object covariance;
     combining the primary and secondary object covariance;
     getting primary and secondary object position vectors;
     computing relative position vectors; and
     projecting the combined covariance onto an encounter plane;
   and computing the miss distance by:
     projecting relative positions of the primary and secondary objects on to the encounter plane.

3. The method of claim 2, wherein, for collision computation at a point of closest approach, the method further comprising:
   getting primary and secondary object velocity vectors; and
   computing relative velocity vectors in order to make projections onto the encounter plane.

4. The method of claim 3, further comprising:
   determining if $P_{max}$ is unacceptably high; and if so
   taking appropriate action;
   otherwise ending the method.

5. The method of claim 3, further comprising:
   determining if the combined covariance is in a probability dilution region; and if so
   warning an operator;
   otherwise ending the method.

6. The method of claim 2, wherein, for line of sight impingement computation, the method further comprising:
   getting an emitter location; and
   computing a line of sight vector in order to make projections onto the encounter plane.

7. The method of claim 6, further comprising:
   determining if $P_{max}$ is unacceptably high; and if so
   taking appropriate action;
   otherwise ending the method.

8. The method of claim 6, further comprising:
   determining if the combined covariance is in a probability dilution region; and if so
   warning an operator;
   otherwise ending the method.

9. The method of claim 1, wherein, when covariance data is not available, the method further comprising:
   selecting a combined covariance aspect ratio (AR) from the group consisting of AR=1, AR="best guess" as deduced from historical covariance data, AR=40, and AR=∞.

10. The method of claim 9, wherein, for collision computation at a point of closest approach, the method further comprising:
    getting primary and secondary object velocity vectors; and
    computing relative velocity vectors in order to make projections onto the encounter plane.

11. The method of claim 10, further comprising:
    determining if $P_{max}$ is unacceptably high; and if so
    taking appropriate action;
    otherwise ending the method.

12. The method of claim 9, wherein, for line of sight impingement computation, the method further comprising:
    getting an emitter location; and
    computing a line of sight vector in order to make projections onto the encounter plane.

13. The method of claim 10, further comprising:
determining if $P_{max}$ is unacceptably high; and if so taking appropriate action;
otherwise ending the method.

14. The method of claim 1, further comprising:
initializing $\sigma_y$ as:

$$\sigma_{y0} = \frac{OBJ}{2 \cdot AR} \cdot \sqrt{\frac{\left[(1-3 \cdot AR^2) \cdot w \cdot \left(\sqrt{1-w^2}\right)^3\right]}{3 \cdot \left(w \cdot \sqrt{1-w^2} + \operatorname{asin}(w)\right)} + \left[\frac{(AR^2+1)}{2} + 2 \cdot \left(\frac{dist}{OBJ}\right)^2\right]}$$

and performing iteration on $\sigma_y$ to find the maximum collision probability within bounds of user tolerance.

15. The method of claim 1, further comprising prescreening by:
setting $$r = \frac{OBJ}{dist}$$

and approximating $P_{max}$ as:

$P_{max} = 0.48394 \cdot r$ where $r < 0.8$ $P_{max} = 0.21329 \cdot \exp(1.01511 \cdot r) - 0.09025$ where $0.8 \leq r < 1.0$ and $P_{max} = 0.5$ where $r = 1$.

* * * * *